United States Patent [19]

Yamamoto et al.

[11] Patent Number: 4,946,240
[45] Date of Patent: Aug. 7, 1990

[54] OPTICAL HARMONIC GENERATION DEVICE

[75] Inventors: Kazuhisa Yamamoto, Hirakata; Tetsuo Taniuchi, Kobe, both of Japan

[73] Assignee: Matsushita Electric Industrial Co., Ltd., Osaka, Japan

[21] Appl. No.: 176,772

[22] Filed: Apr. 1, 1988

[30] Foreign Application Priority Data

Dec. 28, 1987 [JP] Japan .................. 62-331964

[51] Int. Cl.$^5$ .............................................. G02B 6/34
[52] U.S. Cl. ................... 350/96.19; 350/96.12
[58] Field of Search ................... 350/96.12, 96.19

Primary Examiner—William L. Sikes
Assistant Examiner—Robert E. Wise
Attorney, Agent, or Firm—Wenderoth, Lind & Ponack

[57] ABSTRACT

An optical harmonic generating device having a proton-exchanged optical waveguide possessing an upward convex shape and a structure capable of propagating in a single mode, an input part for receiving an optical wave having a fundamental frequency and an output part for outputting a harmonic wave, disposed on a substrate of $LiNb_xTa_{1-x}O_3$ ($0 \leq x \leq 1$). The device is an optical harmonic wave generating device with excellent confinement of light, optimum structure and high efficiency.

8 Claims, 9 Drawing Sheets

OPTICAL HARMONIC GENERATION DEVICE

BACKGROUND OF THE INVENTION

This invention relates to an optical harmonic generating device for use in the optical information processing field utilizing coherent light or in the measurement control field applying light.

A conventional optical harmonic generating device was disclosed, for example, by T. Taniuchi and K. Yamamoto in "Second generation with GaAs laser diode in proton-exchanged LiNbO$_3$ waveguides," ECOC '86, TuC5, 1986. Referring first to FIG. 1, harmonic generation (wavelength 0.42 μm) with respect to light of a fundamental wave with wavelength of 0.84 μm is described below. When light of a fundamental wave P1 enters a plane of incidence of a buried type optical waveguide 2, if the conditions are sufficient to equalize the effective index N1 of the guide mode of the fumdamental wave and effective index N1 of a harmonic wave, the harmonic wave P2 is efficiently emitted from the optical waveguide 2 into a LiNbO$_3$ substrate 1 so that the overall device acts as an optical harmonic generating device.

Such a conventional optical harmonic generating device requires a buried type optical waveguide as a fundamental constituent element. The method of fabricating this buried type optical waveguide was, as disclosed by J. L. Jackel, C. E. Rice, and J. J. Veselka in "Proton exchange for high-index waveguides in LiNbO$_3$," Appl. Phys. Lett., Vol. 141, No. 7, pp. 607-608, 1982, as follows. Cr or Al is evaporated onto a substrate made of LiNbO$_3$ which is a ferroelectric crystal, and a slit of several micrometers in width is formed by a photo process and etching, and the substrate is heated in benzoic acid to form a high refractive index layer (difference in refractive index from that of the substrate of about ΔNe=0.13).

Turning to FIG. 2, a conventional method of fabricating a buried type optical waveguide by employing the proton exchange technique in a solution is explained below. By heating the LiNbO$_3$ substrate 1 on which protective mask 4 and slit 5 are formed in benzoic acid 6, exchange of H+ protons in benzoic acid 6 and Li+ in the LiNbO$_3$ substrate occurs only beneath the slit 5, and a high refractive index layer 2 composed of H$_x$Li$_{1-x}$NbO$_3$ (0≦x≦1) is formed. In FIG. 3C, after removing the protective mask 4, the surface perpendicular to the depth of the buried type optical waveguide 2 is optically polished, and by introducing a fundamental wave, a harmonic wave can be taken out.

The fabricating process is further described with reference to FIG. 3. In FIG. 3A, a protective mask 4 is shown as formed on the LiNbO$_3$ substrate 1 by an ordinary photo process. The material of this protective mask 4 is aluminum. In FIG. 3B, the substrate is heated for 12 minutes in benzoic acid (230° C.), and a 0.5 μm thick buried type optical waveguide 2 is formed. In FIG. 3C, after removing the protective mask 4, the surface perpendicular to the depth of the buried type optical waveguide 2 is optically polished, and by introducing a fundamental wave, a harmonic wave can be taken out.

The optical harmonic generating device fabricated by the above treatment with benzoic acid has a maximum conversion efficiency at a thickness of the waveguide 2 of 0.5 μm for a fundamental wave P1=100 mW with a wavelength of 0.84 μm, and a harmonic wave of P2=2 mW was obtained when the length of the waveguide was set at 10 mm. In this case, the conversion efficiency P1/P2 is 2%.

In the optical harmonic generating device having such a buried type optical waveguide, the refractive index difference in the lateral direction was small, and confinement of light in the lateral direction was weak, and the width of the actually fabricated optical waveguide expanded in the lateral direction as compared with the mask width to further worsen the confinement. It was hence difficult to obtain a conversion efficiency of over 5% which is a practical level of efficiency of an optical harmonic generating device.

SUMMARY OF THE INVENTION

It is hence a primary object of this invention to provide an optical harmonic generating device capable of enhancing the conversion efficiency greatly by modifying the structure of the optical harmonic generating device having an optical waveguide. That is, this invention is intended to obtain a highly efficient optical harmonic generating device by employing a structure to enhance the confinement of light by using a convex proton-exchanged optical waveguide on a substrate capable of propagating only a single mode of a fundamental wave. The term convex is used in the sense of "regularly protuberant".

To achieve the above object, the optical harmonic generating device of this invention has a convex proton-exchanged optical waveguide in a structure to propagate only a single mode of a fundamental wave, an input part of a fundamental wave, and an output part of harmonic wave, and disposed on a substrate made of LiNb$_x$Ta$_{1-x}$O$_3$ (0≦x≦1).

According to the present invention as described herein, the following benefits, among others, are obtained.

(1) By forming a convex proton-exchanged optical waveguide in a structure to propagate only a single mode of a fundamental wave on a LiNb$_x$Ta$_{1-x}$O$_3$ substrate, confinement of light is increased, and the conversion efficiency of optical harmonic generating device is greatly improved.

(2) Fine processing becomes easy by etching the substrate on which a high refractive index layer is formed by a proton exchange process, and the propagation loss of the optical waveguide having a convex structure on the basic constituent part of the optical harmonic generating device is substantially decreased, and its practical effect is enormous.

While the novel features of the invention are set forth in the appended claims, the invention, both as to organization and content, will be better understood and appreciated, along with other objects and features thereof, from the following detailed description taken in conjunction with the drawings.

DETAILED DESCRIPTION OF THE INVENTION

Referring now to FIG. 4, the structure of a first embodiment of an optical harmonic generating device of this invention is described below. In this embodiment, an optical harmonic generating device is formed on an $LiNbO_3$ substrate 1, and a ridge-type optical waveguide having a convex, i.e. regularly protuberant, structure is used.

Figure 1A:
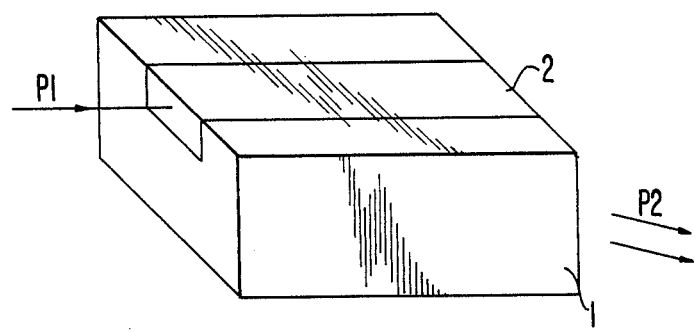
FIGS. 1A and 1B are a perspective view and side view respectively, showing the structure of a conventional optical harmonic generating device.
Figure 1B:
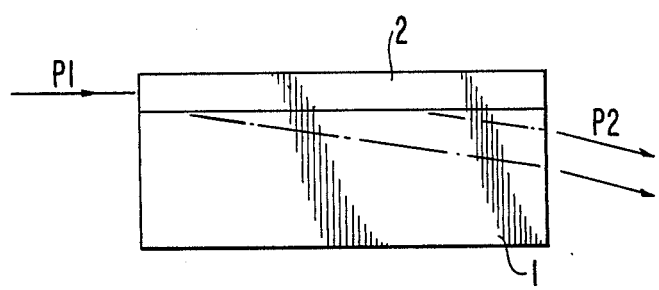
Figure 2:
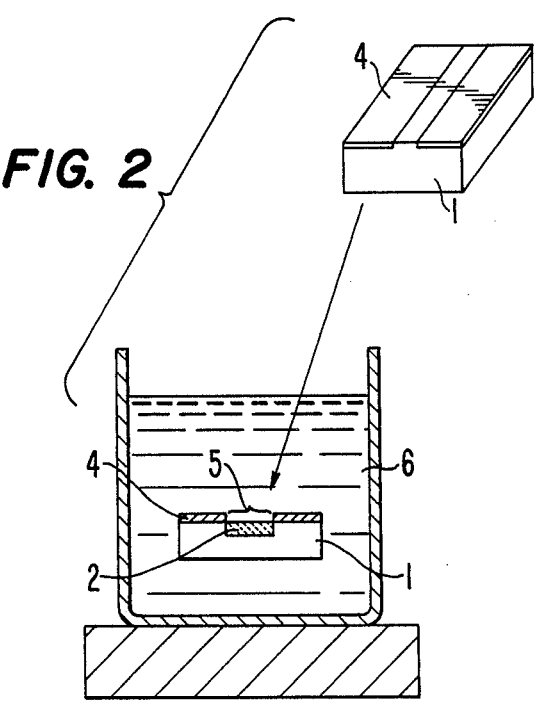
FIG. 2 is a diagrammatic view showing a method of fabricating a conventional optical wavelength converting device.
Figure 3A:
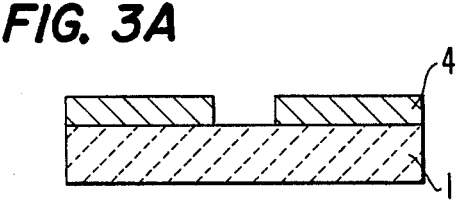
FIGS. 3A, 3B, and 3C are sectional views showing a conventional optical harmonic generating device at various stages of its preparation.
Figure 3B:
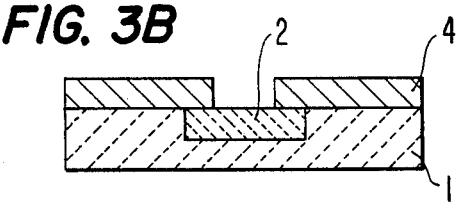
Figure 3C:
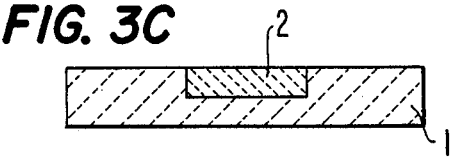
Figure 4A:
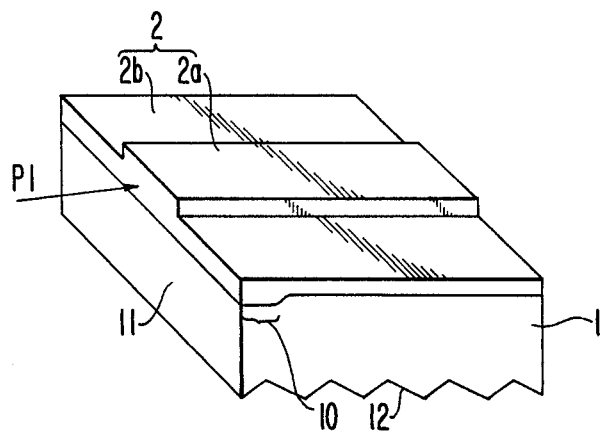
FIGS. 4A, 4B and 4C are respectively a perspective view and section views of an optical harmonic generating device according to one of the embodiments of this invention.
Figure 4B:
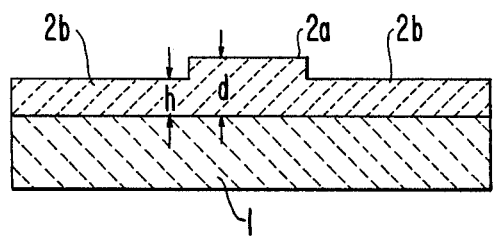
Figure 4C:
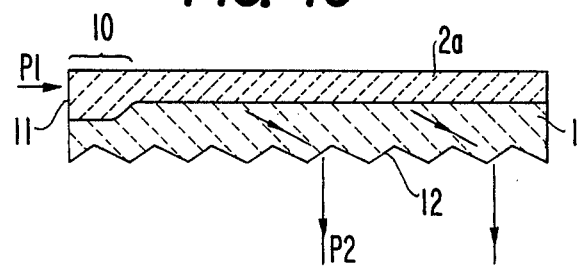

In FIGS. 4A–4C, numeral 1 denotes an $LiNbO_3$ substrate of +Z board (the + side of the substrate cut perpendicular to the Z-axis), 2 denotes a high refractive index layer formed by a proton-exchange treatment in pyrophosphoric acid, 10 designates an input part for inputting fundamental wave P1, and 12 designates an output part for outputting a harmonic wave. Besides, in the high refractive index layer 2, 2a designates an upwardly protuberant core part through which light propagates, and 2b designates a clad part. A grating is formed in the output part 12.

Figure 5A:
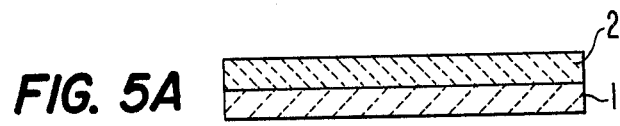
FIGS. 5A, 5B, 5C, 5D, and 5E are sectional views showing a first example of a fabricating method of the optical harmonic generating device of FIGS. 4A–4C.
Figure 5B:
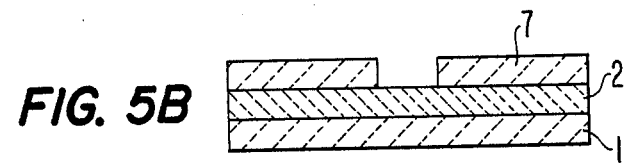
Figure 5C:
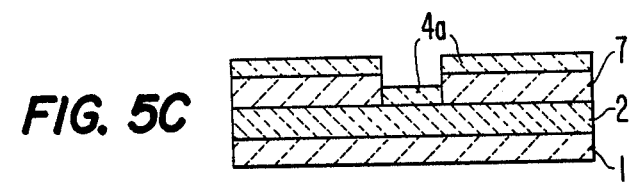

The method of fabricating this optical harmonic generating device is described herein with reference to FIGS. 5A–5E. As shown in FIG. 5A, a high refractive index layer 2 with a thickness of 0.37 μm is formed on an $LiNbO_3$ substrate. This is done by heating for five minutes (proton exchange treatment) in pyrophosphoric acid, which is one of the phosphoric acids, at 230° C. Next, a thickness of 1.2 μm is formed on said high refractive index layer 2 by an ordinary photo process to produce the item in FIG. 5B. Next, a protective mask 4a of Ti with a thickness of 0.3 μm is formed by electron beam deposition to produce the item of FIG. 5C. The advantages of Ti are that it is only slightly etched by ECR etching using $C_3F_8$ gas and that a pattern can be formed easily by lift-off.

Figure 5D:
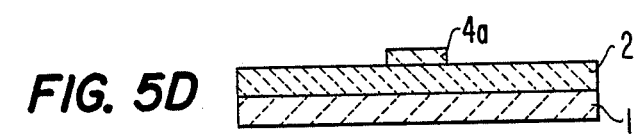
Figure 5E:
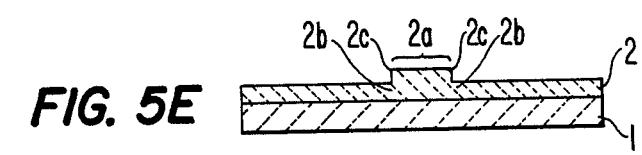

Next, the photoresist 7 is dissolved in acetone and lifted off, leaving the Ti pattern 4a shown in FIG. 5D. As a result, a protective mask 4a of Ti is formed on the high refractive index layer 2 with a thickness of 1.5 μm and a length of 8 mm. In this way, when the lift-off method is employed in forming the pattern of Ti, the side surface of the Ti pattern becomes smooth, and the side surface of the waveguide formed after etching also becomes smooth. Accordingly, the propagation loss can be reduced. Finally, using the mask 4a, etching is performed by a reactive ion beam etching apparatus using an ECR ion source, and portions unprotected by the mask 4a are etched away. The ECR etching using $C_3F_6$ gas was conducted for five minutes at an acceleration voltage of 400 V and a degree of vacuum of $1 \times 10^{-4}$ Torr. The depth of etching of the high refractive index layer 2 is 2000 Å. Afterwards, the Ti mask 4a is removed by immersion for one minute in a mixed solution of sodium hydroxide and hydrogen peroxide (10:1) at 70° C., and a ridge-type waveguide as shown in FIG. 5E is formed. The part immediately beneath the protective mask a is the upwardly protuberant core part 2a of the ridge-type waveguide, and the etched portion is the clad part 2b as shown in FIGS. 4A–4C.

Figure 6:
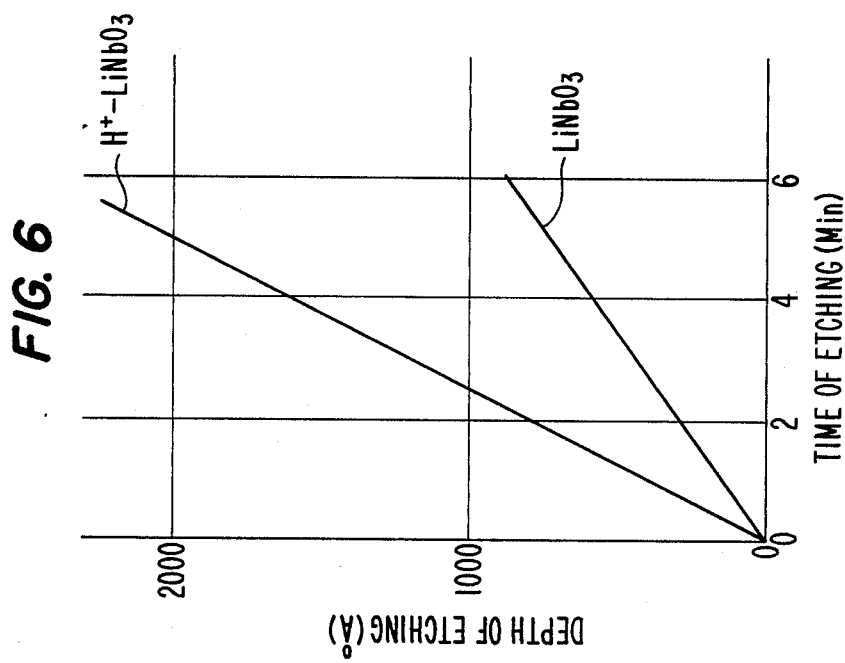
FIG. 6 is a graph showing the relation between the etching time and etching quantity for the materials used in the present invention.

FIG. 6 shows the etching characteristic (the relation between the time for etching and the depth of etching) of the untreated $LiNbO_3$ and proton-exchanged $LiNbO_3$ ($H^+$—$LiNbO_3$), that is, the high refractive index layer under the above conditions. As compared with the untreated $LiNbO_3$, the proton-exchanged $LiNbO_3$ has an etching rate three times as high. Therefore, as compared with the method of direct etching of $LiNbO_3$, the proton exchange process brings about a significant improvement in the etching rate, and fine pattern lithography becomes easier.

Using such a process, a ridge type optical waveguide was fabricated. In this optical waveguide, the thickness h of the clad part $2_b$ was 0.17 μm, the thickness of the core part $2_a$ was 0.37 μm, and the ridge ratio h/d was 0.46. The side surface 2c of the optical waveguide formed by etching was very smooth, being less than ±2000 Å. The core part 2a of this high refractive index layer 2 is the optical waveguide. By partially heating this optical waveguide 2, an input part 10 of an increased thickness was formed. By increasing the thickness of the input part, the coupling efficiency with the fundamental wave is enhanced. By optically polishing the surface perpendicular to the optical waveguide 2, a plane of incidence 11 was formed on the input part 10. Finally, by forming a grating in the output part 12 by a photo process and ECR etching, the optical harmonic generating device as shown in FIG. 4A was fabricated. The length of this device was 6 mm. In FIG. 4C, when a semiconductor laser light with a fundamental wave P1 (wavelength 0.34 μm) was guided from the input part 10, it propagated in a single mode, and a harmonic wave P2 of wavelength 0.42 μm was taken out to the outside of the substrate from the output part 12. The direction of emission of this harmonic wave P2 was perpendicular to the optical waveguide 2, and this is because direction of the harmonic wave coming out at an angle of 10 degrees into the substrate was converted by the grating formed in the output part 12. The period of this grating is 0.2 μm. Accordingly, the optical guide length of the parts of the harmonic wave were equalized, and the astigmatism when converged was eliminated.

Figure 7:
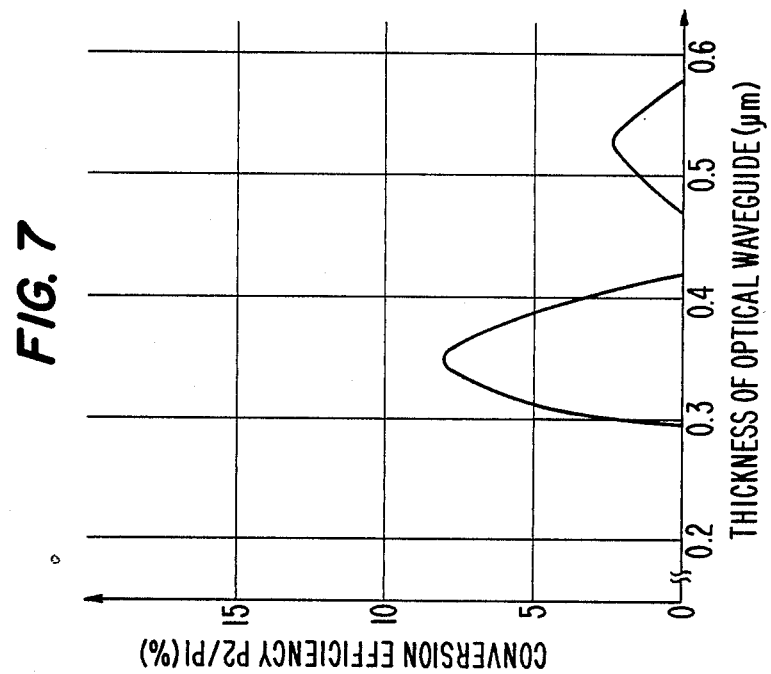
FIG. 7 is a graph showing the conversion efficiency dependence on the thickness of a proton-exchanged waveguide.
Figure 8:
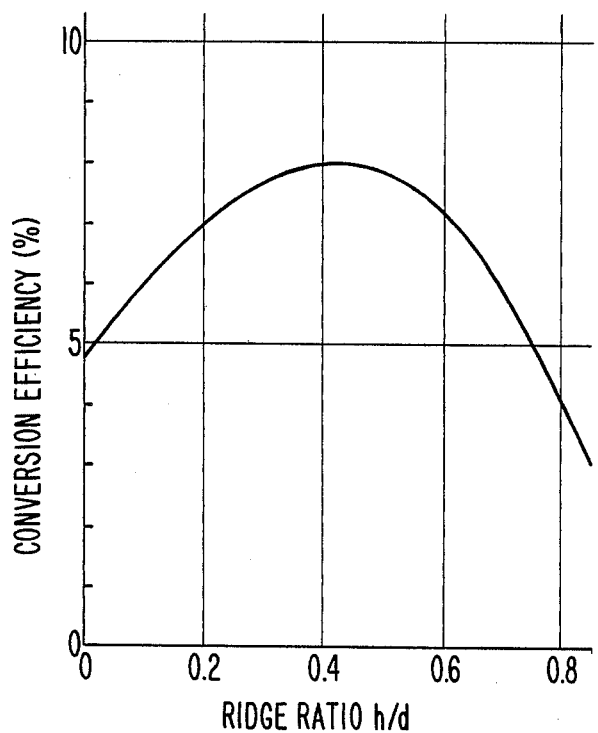
FIG. 8 is a graph showing the relation between the ridge ratio h/d and the conversion efficiency.

From the input of a fundamental wave of 100 mW, a harmonic wave of 8 mW (wavelength 0.42 μm) was obtained. In this case, the conversion efficiency was 8%. The conversion efficiency is thus greatly improved as compared with the conventional optical harmonic generating device using the buried type optical waveguide. The propagation loss was nearly the same as that of the buried type optical waveguide. This is believed to be because the asperities of the side surface were decreased as a result of the use of the proton exchange process to facilitate the fine pattern lithography of LiNbO₃. The conversion efficiency with respect to the thickness d of the optical waveguide is shown in FIG. 7. A good value of harmonic wave was obtained between 0.3 and 0.42 μm, and it corresponds to 1.05 to 1.5 times the cut-off thickness $d_{cut}$. This cut-off thickness $d_{cut}$ is determined according to the following equation:

$$d_{cut} = \tan^{-1}(n_f^2, \sqrt{n_s^2 - 1} / \sqrt{n_f^2 - n_s^2})/(k_0 \sqrt{n_f^2 - n_s^2})$$

where $n_s$ is the refractive index of the LiNbO₃ substrate 1, $n_f$ is the refractive index of the high refractive index layer 2, and $k_0$ is $2\pi/\lambda$ assuming the wavelength of the fundamental wave to be λ. The values used in this embodiment are put into the above equation. That is, the wavelength λ of the fundamental wave is 0.84 μm, the refractive index of the LiNbO₃ substrate 1 at that wavelength is 2.17, and the refractive index of the high refractive index layer is 2.28. Accordingly, $d_{cut}$ is 0.285 μm, and the peak is present somewhere between 1.05 and 1.5 times this value. The maximum refractive index difference of the high refractive index layer 2 formed by the pyrophosphoric acid treatment used in this embodiment from the LiNbO₃ substrate 1 is more than 10% higher than the value obtained by the treatment in the solution of benzoic acid. Accordingly, the confinement of light is great which is one of the conditions for enhancement of the conversion efficiency. The relation between the ridge ratio h/d and the conversion efficiency is shown in FIG. 8. As the ratio d/h approaches 0, the confinement of light is improved, but at the same time the propagation loss increases and the conversion efficiency apparently does not increase, and the ratio h/d has a peak around 0.4.

In the multimode propagation, the output of the harmonic wave is unstable, and it is not practicable.

Figure 9A:
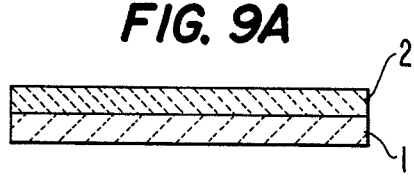
FIGS. 9A, 9B and 9C are sectional views showing another embodiment of a fabricating method of an optical harmonic generating device according to the invention.
Figure 9B:
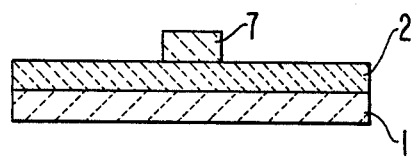
Figure 9C:
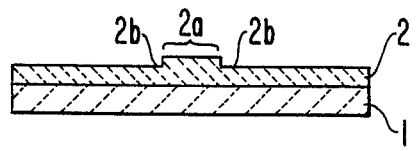

A different example of the method of fabrication of an optical harmonic generating device is described referring to FIGS. 9A-9C. In this example, as the optical harmonic generating device, a ridge-type optical waveguide is fabricated on the LiNbO₃ substrate by using a dry etching technique. In FIGS. 9A-9C, numeral 1 designates an LiNbO₃ substrate of +Z board (the +side of the substrate cut perpendicularly to the Z-axis), and 2 designates a high refractive index layer with a thickness d of 0.37 μm formed by a proton exchange process in phosphoric acid. To begin with, a high refractive index layer 2 is formed by proton exchange process on the LiNbO₃ substrate 1 to produce the structure of FIG. 9A. A photoresist 7 is formed by an ordinary photo process on the high refractive index layer 2 to be used as a protective mask as shown in FIG. 9B. Finally, etching is performed for 20 minutes in a vacuum of $3 \times 10^{-2}$ Torr, at 70 W, by a dry etching process using CF₄ as the gas. The depth of etching was 1500 Å resulting in the structure of FIG. 9C.

By this process, the ridge-type optical waveguide was fabricated. In this optical waveguide, the thickness h of the clad part 2b was 0.22 μm, the thickness of the core part 2a was 0.37 μm, and the ridge ratio h/d was 0.6. Besides, the side surface of the core part 2a was very smooth, and this core part 2a of the high refractive index layer 2 became the optical waveguide. By optically polishing the surface perpendicular to the optical waveguide, an optical harmonic generating device was obtained. When semiconductor laser light of 100 mW (wavelength 0.84 μm) was applied as a fundamental wave, a harmonic wave of 6 mW (wavelength 0.42 μm) was obtained. The conversion efficiency in this case was 6%. As in this embodiment, when photoresist is used as a protective mask, an optical harmonic generating device can be fabricated by a simple process.

Figure 10A:
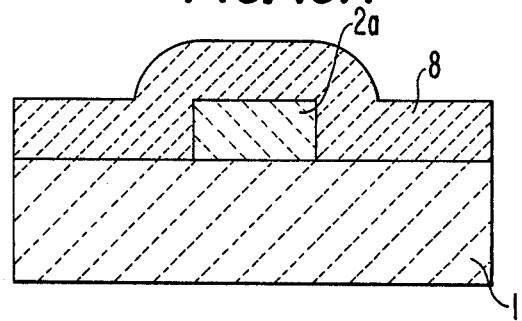
FIGS. 10A and 10B are sectional views of a further embodiment of an optical harmonic generating device according to the present invention.
Figure 10B:
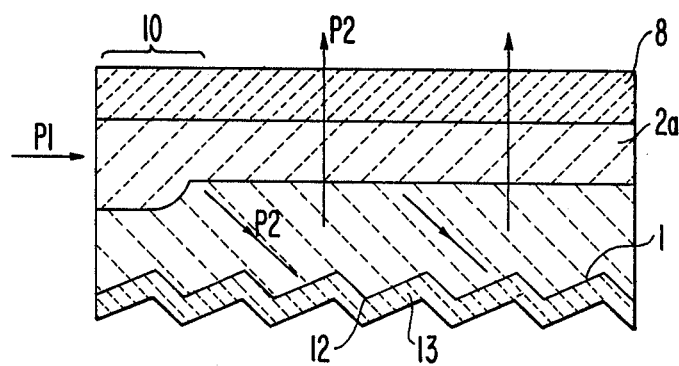
Figure 11A:
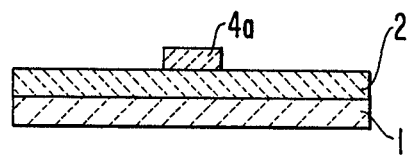
FIGS. 11A, 11B, and 11C are sectional views showing the fabricating method of the device of FIGS. 10A and 10B.
Figure 11B:
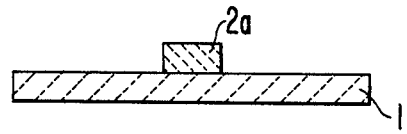
Figure 11C:
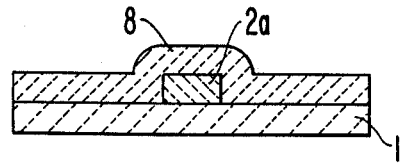
Figure 12:
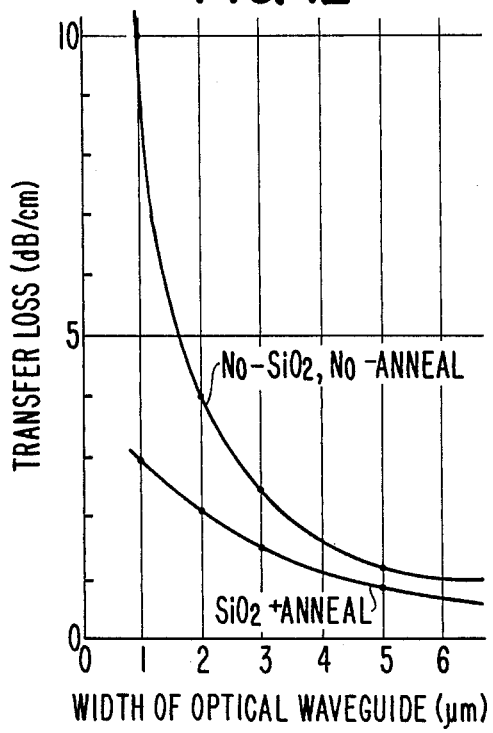
FIG. 12 is a graph showing the relation between the width of optical waveguide and the propagation loss.

Referring to FIGS. 10A and 10B, another example of an optical harmonic generating device of this invention is described. In FIG. 10A, the substrate 1 the same as that of the preceding embodiments, has the high refractive index layer 2a protected by a protective film 8 of SiO₂. In FIG. 10B, the fundamental wave entering from the input part 10 is converted into harmonic wave P2 in the optical waveguide 2a, and is emitted into the LiNbO₃ substrate 1. This harmonic wave P2 is emitted from the substrate in the direction perpendicular to the optical waveguide 2 through an Al film 13 formed on the output part 12 which converts the direction to the perpendicular direction by the coating grating. In FIGS. 11A-11C, the structures resulting from the manufacturing process of the optical harmonic generating device including an annealing step and a protective film forming step are shown. A MgO-doped LiNbO₃ substrate 1 was subjected to proton exchange and annealing resulting in the structure of FIG. 11A. Practically, after forming a high refractive index layer 2 with a thickness of 0.3 μm by proton exchange in pyrophosphoric acid for four minutes at 23° C., it was subjected to annealing for 20 minutes in air at 190° C. By this annealing, the thickness of the high refractive index layer 2 was increased to 0.35 μm. As a result of this annealing step, the optical waveguide became further homogeneous, and the propagation loss was reduced. Afterwards, a protective mask 4a of Ti was formed thereon. Next, ERC etching was conducted to produce the structure of FIG. 11B. The conditions were C₃F₈ gas, acceleration voltage of 400 V, degree of vacuum of $1 \times 10^{-4}$ Torr, and 10 minutes of etching. The etching depth was nearly 4000 Å (0.4 μm). Finally, SiO₂ was 4000 Å. Use of SiO₂ as a protective film is advantageous because scattering and absorption do not occur in the protective film. By this protective film deterioration of the characteristics of the optical harmonic generating device by contamination of the surface can be prevented. FIG. 12 shows the relation between the width of the optical waveguide and propagation loss, comparing the case of the waveguide with the SiO₂ film and annealing to the case of a waveguide without the SiO₂ film and annealing. A significant decrease of the propagation loss is seen. The ridge ratio d/H of the optical harmonic generating device fabricated by this process was 0. The conversion efficiency of this optical harmonic generating device was 10% because a harmonic wave of 10 mW was obtained from an input of a fundamental wave P1 of 100 mW with a wavelength of 0.78 μm.

In addition, due to MgO-doping, optical damage can be prevented even from light with a short wavelength, and the output of the harmonic wave does not fluctuate.

Meanwhile, by forming the proton-exchanged optical waveguide in a triangular form, the shape of the propagation mode of the fundamental wave is hardly changed, and the structure becomes stronger in resistance against optical damage.

In the following example, the optical harmonic generating device of this invention is used for the optical wavelength conversion of light from a YAG laser having a wavelength of the fundamental wave of 1.06 μm. The basic structure of the optical harmonic generating device is based on the construction shown in FIG. 4A, and the method of fabrication is based on the example described in connection with FIGS. 5A–5E. In this embodiment, after formation of a protective mask of Ti, wet etching was conducted in order to make the side surface of the protective mask smooth. Practically, after forming a protective mask of Ti with a thickness of 3500 Å, wet etching was conducted for one minute at 25° C. in a mixed solution of HF, $HNO_3$ and $H_2O$ (mixing ratio 1:1:800), and Ti was etched to a depth of 500 Å. As a result, the asperities of the side surface were reduced to less than ±100 Å.

In the thus fabricated optical harmonic generating device, the thickness of the core part $2$ was 0.55 μm, the thickness of the clad part $2b$ was 0.2 μm, and the ridge ratio was 0.4. The thickness d of the core part was 1.3 times the cut-off thickness $d_{cut}$. The conversion efficiency of the generated wavelength 0.53 μm to the harmonic wave was 8.5%. Thus, when the wavelength of the fundamental wave varies, it is possible to convert it into a harmonic wave at high efficiency when the thickness is designed according to the equation presented earlier.

Incidentally, by using fundamental waves with a wavelength of 0.65 to 1.6 μm, generation of harmonic waves by this optical harmonic generating device was confirmed.

Figure 13A:
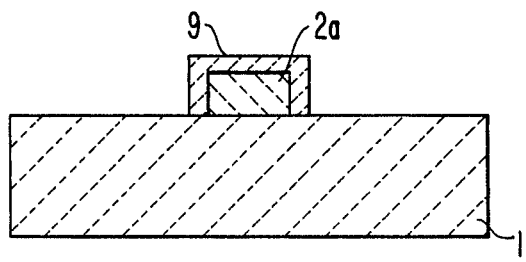
FIG. 13 is a sectional view showing the structure of a still further embodiment of an optical harmonic generating device according to the invention.
Figure 13B:
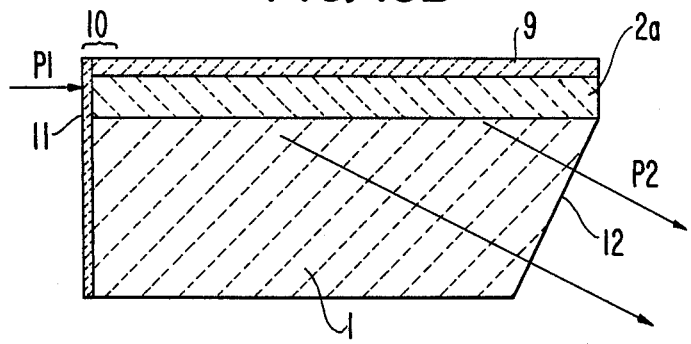

As a further embodiment of the optical harmonic generating device of this invention, an example using an enclosed core-type optical waveguide is described herein. A sectional view thereof is shown in FIG. 13A, and a lateral sectional view is shown in FIG. 13B. In the method of fabrication, a low refractive index layer 9 was formed on the outside of a core part $2a$ by heating a modified ridge-type optical waveguide having only a core part $2a$ and no cladding in stearic acid containing lithium stearate. The refractive index of the low refractive index layer 9 is 0.01 higher than that of the $LiNbO_3$ substrate 1. The thickness of the low refractive index layer 9 is 0.1 μm, and the thickness of the high refractive index layer optical waveguide $2a$ is 0.4 μm, and its width is 2 μm. The propagation loss for a wavelength of 0.8 μm was 3 dB/cm. Thus, by enclosing the core part of the optical waveguide $2a$ inside layer 9, propagation loss due to scattering in the proton-exchanged optical waveguide has been significantly lowered.

In FIG. 13B, numeral 11 designates the plane of incidence formed at the input part 10 for inputting the fundamental wave, and $SiO^2$ is coated on the plane of incidence 11 as a reflection preventive film. As a result, the coupling efficiency of the fundamental wave P1 to the optical waveguide 2 is raised by 15%. The output plane 12 is polished perpendicularly to the emitted harmonic wave P2, and the harmonic wave P2 directly passes out of the $LiNbO^3$ substrate. This construction is resistant to the effects of change in the output angle of the harmonic wave due to temperature changes.

In making this embodiment, $CF_4$ was used as the fluorine gas, but $CHF_3$, $C_2F_6$ and other gases may also be used. Similarly, as the acid for proton exchange, phosphoric acid was used, but the optical waveguide may be formed easily by using other phosphoric acids mainly composed of orthophosphoric acid or the like.

Figure 14:
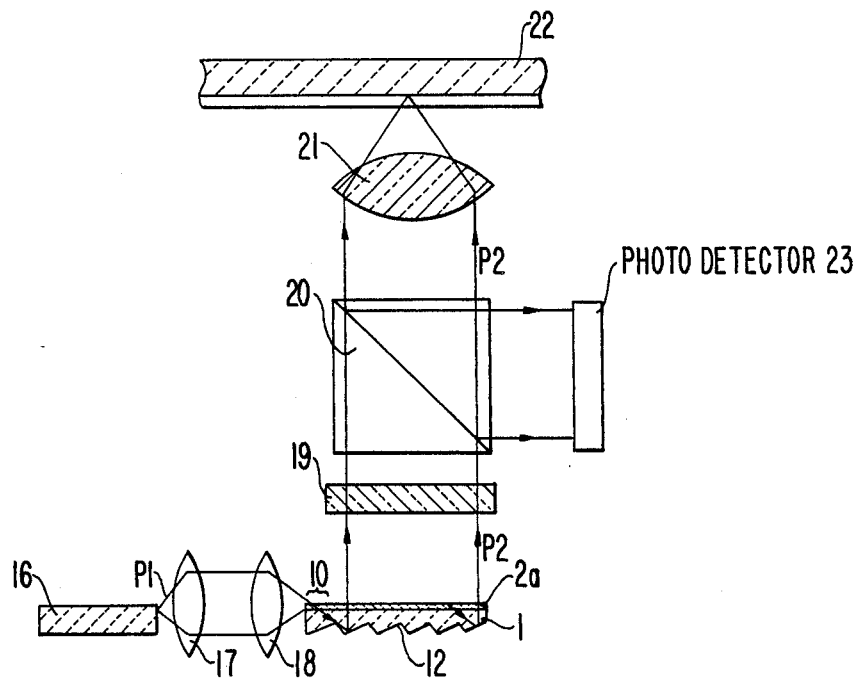
FIG. 14 is a diagrammatic view of an apparatus utilizing an optical harmonic generating device according to the invention.

An example of the use of the optical harmonic generating device of this invention in an apparatus for reading of optical disc is explained below in connection with FIG. 14. The fundamental wave P1 leaving the semiconductor laser 16 is adjusted to a parallel light by a collimator lens 17, and is coupled into the input part 10 of the $LiNbO_3$ substrate 1 by using a focusing lens 18. This fundamental wave P1 is converted into harmonic wave P2 in the optical waveguide $2a$, and is emitted into the $LiNbO_3$ substrate 1, and the direction is changed by the grating possessing an Al reflection film formed at the output part 12, and the harmonic wave P2 is emitted as parallel light in the lengthwise direction of the optical waveguide 2 and as dispersion light in the widthwise direction, as viewed from above the $LiNbO_3$ substrate 1. This harmonic wave P2 is sent into the cylindrical lens 19 for beam formation so that the dispersion light side is changed to parallel light. The thus parallel-adjusted harmonic wave P2 passes through a polarizing beam splitter 20, and is converged by the focusing lens 21, thereby forming a spot of 0.6 μm diameter on the optical disc 22. This reflection signal passes again through the polarizing beam splitter 20, and enters a photo detector 23. Using a semiconductor laser 16 with wavelength of 0.84 μm and output of 60 mW, 50 mW was coupled into the optical waveguide 2 as fundamental wave P1. As a result, a harmonic wave P2 of 2 mW was irradiated. Of this, a harmonic wave P2 of 2 mW was emitted in the direction perpendicular to the plane on which the optical waveguide 2 is formed, and the emitted light was used in reading of an optical disc. Thus, by using the optical harmonic generating device of this invention, as compared with the conventional optical disc reading system using a semiconductor laser with a 0.8 μm band, the spot size can be reduced by half, and the recording density in the optical disc can be improved fourfold. Besides, by emitting the harmonic wave on the plane on which the optical waveguide is formed, an astigmatism-free spot may be easily obtained.

While specific embodiments of the invention have been illustrated and described herein, it is realized that other modifications and changes will occur to those skilled in the art. It is therefore to be understood that the appended claims are intended to cover all modifications and changes which fall within the true spirit and scope of this invention.

We claim:

1. An optical harmonic wave generating device comprising:
    a substrate of $LiNb_xTa_{1-x}O_3$ ($0 \leq x \leq 1$);
    an optical waveguide on said substrate formed by a proton exchange process and having an input part for receiving an input optical wave having a fundamental frequency and propagating said fundamental frequency wave in a single mode and outputting a harmonic wave, said optical waveguide having an upwardly protuberant core part extending in a direction along one surface of said substrate and a clad part having a thickness in a direction perpendicular to said one surface of said substrate less than the corresponding thickness of said core part and covering the part of said one surface of said substrate which is not covered by said core part; and said substrate having an output part for receiving the harmonic wave outputted by said optical waveguide and outputting it from said device.

2. A device as claimed in claim 1 further comprising a grating on said output part for changing the direction of the derived harmonic wave to a direction perpendicular to said one surface on said substrate.

3. A device as claimed in claim 1 in which said substrate is a Z-board.

4. A device as claimed in claim 1 in which the surface of the core part of said optical waveguide other than the surface against said substrate is enclosed by a layer of material having a refractive index higher than the refractive index of the material of the substrate and lower than the refractive index of said optical waveguide.

5. A device as claimed in claim 1 in which the material of said substrate is doped with MgO.

6. A device as claimed in claim 1 in which said output part has an output surface perpendicular to the direction of the harmonic wave emitted from said optical waveguide.

7. A device as claimed in claim 1 further comprising a reflection preventing film on the surface of said input part which receives the fundamental frequency optical wave.

8. A method of fabricating an optical harmonic wave generating device, comprising:

forming on a substrate of $LiNb_xTa_{1-x}O_3$ ($0 \leq x \leq 1$) a high refractive index layer by a proton exchange treatment carried out by heating said substrate in an acid;

forming a protective mask on said layer on said substrate in an area which is to be formed into an optical waveguide; and etching said layer in the surface area thereof other than the area protected by said protective mask for removing at least a portion of said layer, for leaving in the unetched area the desired optical waveguide.

* * * * *